United States Patent
Gibson et al.

(10) Patent No.: US 11,388,977 B2
(45) Date of Patent: Jul. 19, 2022

(54) COMPACT COLLAPSIBLE HAMMOCK STAND

(71) Applicant: Yellow Leaf Hammock, LLC, San Francisco, CA (US)

(72) Inventors: Bryce Gibson, Dedham, MA (US); Kurt MacLaurin, Lincoln, MA (US)

(*) Notice: Subject to any disclaimer, the term of this patent is extended or adjusted under 35 U.S.C. 154(b) by 0 days.

(21) Appl. No.: 17/075,282

(22) Filed: Oct. 20, 2020

(65) Prior Publication Data
US 2021/0112954 A1    Apr. 22, 2021

Related U.S. Application Data

(60) Provisional application No. 62/924,592, filed on Oct. 22, 2019.

(51) Int. Cl.
*A45F 3/24* (2006.01)
*F16M 11/38* (2006.01)

(52) U.S. Cl.
CPC ............... *A45F 3/24* (2013.01); *F16M 11/38* (2013.01)

(58) Field of Classification Search
CPC ..... A45F 3/22; A45F 3/24; A45F 3/26; F16M 11/38
See application file for complete search history.

(56) References Cited

U.S. PATENT DOCUMENTS

| 950,070 A | 2/1910 | Funke |
| 3,593,352 A * | 7/1971 | Britt ......................... A45F 3/24 5/127 |
| D295,242 S | 4/1988 | Frick et al. |
| 4,925,138 A * | 5/1990 | Rawlins ..................... A45F 3/24 5/127 |
| 5,097,546 A | 3/1992 | Turner, III |
| 5,392,476 A | 2/1995 | Williams |
| 5,659,907 A | 8/1997 | Huang |
| 5,983,422 A | 11/1999 | Bayless |
| D429,078 S | 8/2000 | White |
| 6,134,727 A | 10/2000 | Hwang |

(Continued)

FOREIGN PATENT DOCUMENTS

| WO | 2001074194 A1 | 10/2001 |
| WO | 20080114092 A1 | 9/2008 |

OTHER PUBLICATIONS

International Search Report and Written Opinion from International Patent Application No. PCT/US2020/056492 dated Jan. 22, 2021.

(Continued)

*Primary Examiner* — Peter M. Cuomo
*Assistant Examiner* — George Sun
(74) *Attorney, Agent, or Firm* — McCarter & English, LLP

(57) ABSTRACT

A collapsible stand for a hammock comprising a support structure having a first hub assembly and a second hub assembly coupled by a pair of cross beams, a base portion having four legs removably coupled to, and extended down and away from the support structure, to form a pyramidal frustum, and an upright portion having a first upright assembly and a second upright assembly removably coupled to, and extending up and at angles away from the support structure, the first upright assembly and the second upright assembly each having an attachment point at a distal end opposite the support structure.

11 Claims, 13 Drawing Sheets

(56) References Cited

U.S. PATENT DOCUMENTS

| | | | |
|---|---|---|---|
| 6,418,577 B1 | 7/2002 | Murphy | |
| 6,454,348 B1 | 9/2002 | Wu | |
| 6,467,109 B1 | 10/2002 | Wu | |
| 7,089,610 B2 | 8/2006 | Zhong | |
| 7,272,865 B2 | 9/2007 | Le Gette et al. | |
| 7,441,287 B2 | 10/2008 | Zheng | |
| 7,996,935 B1 * | 8/2011 | Chen | A45F 3/24 5/120 |
| D688,062 S * | 8/2013 | Dao | D6/387 |
| 8,806,676 B2 * | 8/2014 | Reeb | A45F 3/22 5/120 |
| 8,899,686 B1 | 12/2014 | Kim | |
| 9,066,597 B2 | 6/2015 | Lee | |
| 9,861,180 B1 * | 1/2018 | Jungling | A45F 3/24 |
| D820,072 S | 6/2018 | Choi | |
| 10,441,060 B1 * | 10/2019 | Pinholster, Jr. | A45F 3/24 |
| 10,758,047 B2 * | 9/2020 | Brensinger | A47C 3/0255 |
| 2004/0205893 A1 | 10/2004 | Chen | |
| 2005/0210582 A1 | 9/2005 | Branch | |
| 2007/0017026 A1 * | 1/2007 | Lam | A45F 3/24 5/127 |
| 2015/0091352 A1 | 4/2015 | Lee | |
| 2016/0113402 A1 | 4/2016 | Lee | |
| 2019/0000220 A1 * | 1/2019 | Lemmens | A45F 3/24 |
| 2019/0075915 A1 * | 3/2019 | Wilke | A45F 3/24 |

OTHER PUBLICATIONS

Nemo Stargaze Recliner Luxury Chair, NEMO Equipment, Inc., <https://www.nemoequipment.com/product/stargaze-luxury/>, 2020 but Applicants understand that like literature was available before Applicant's filing date of Oct. 22, 2019.

* cited by examiner

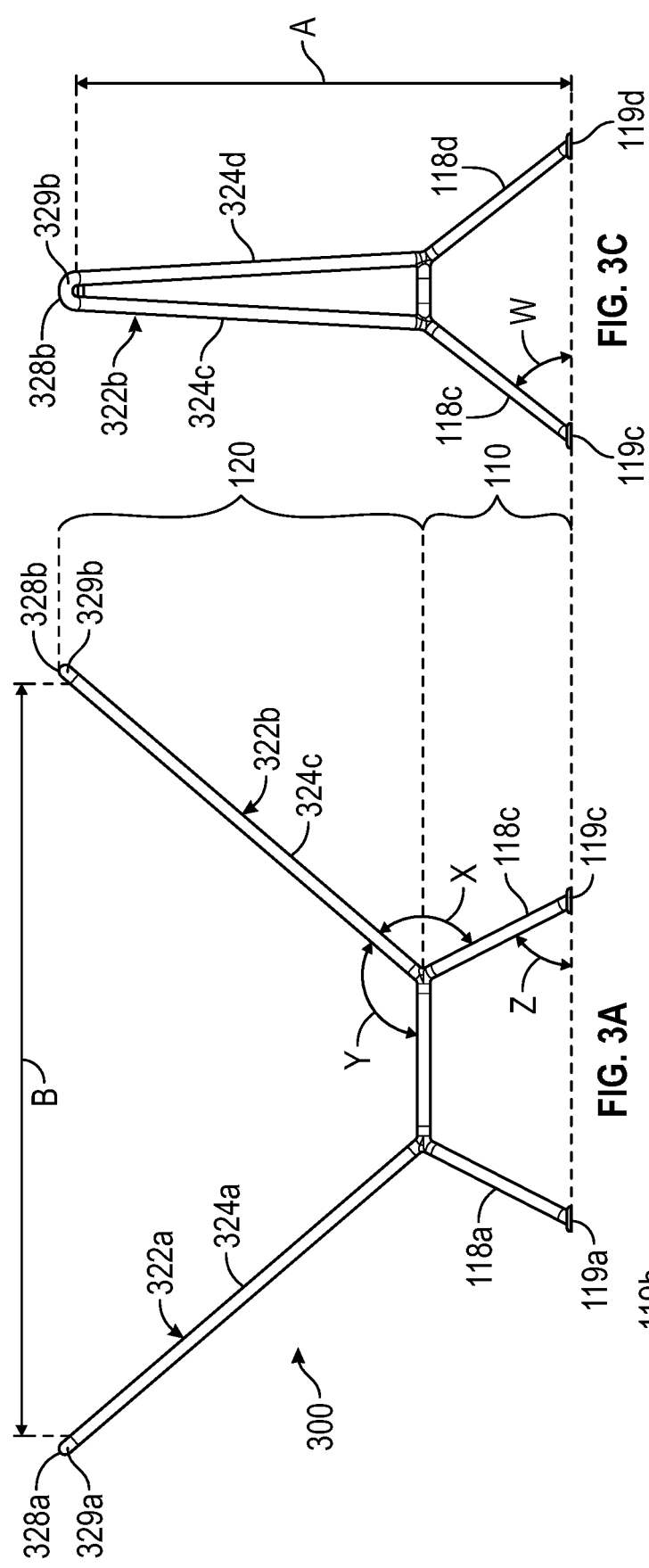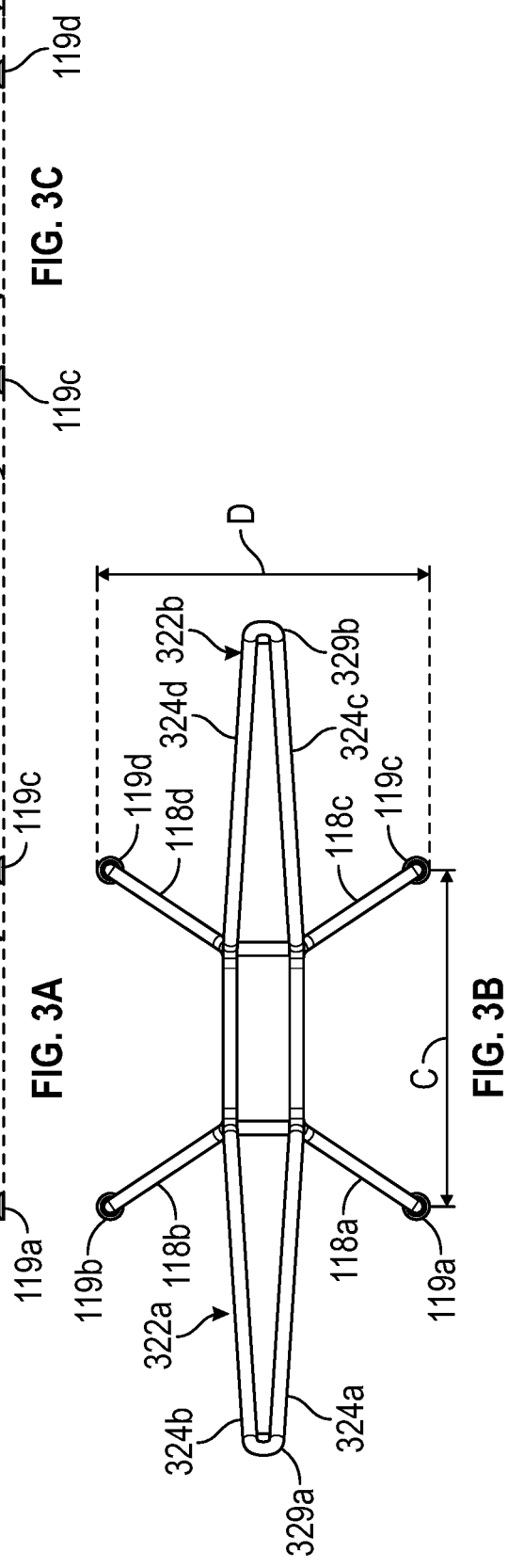

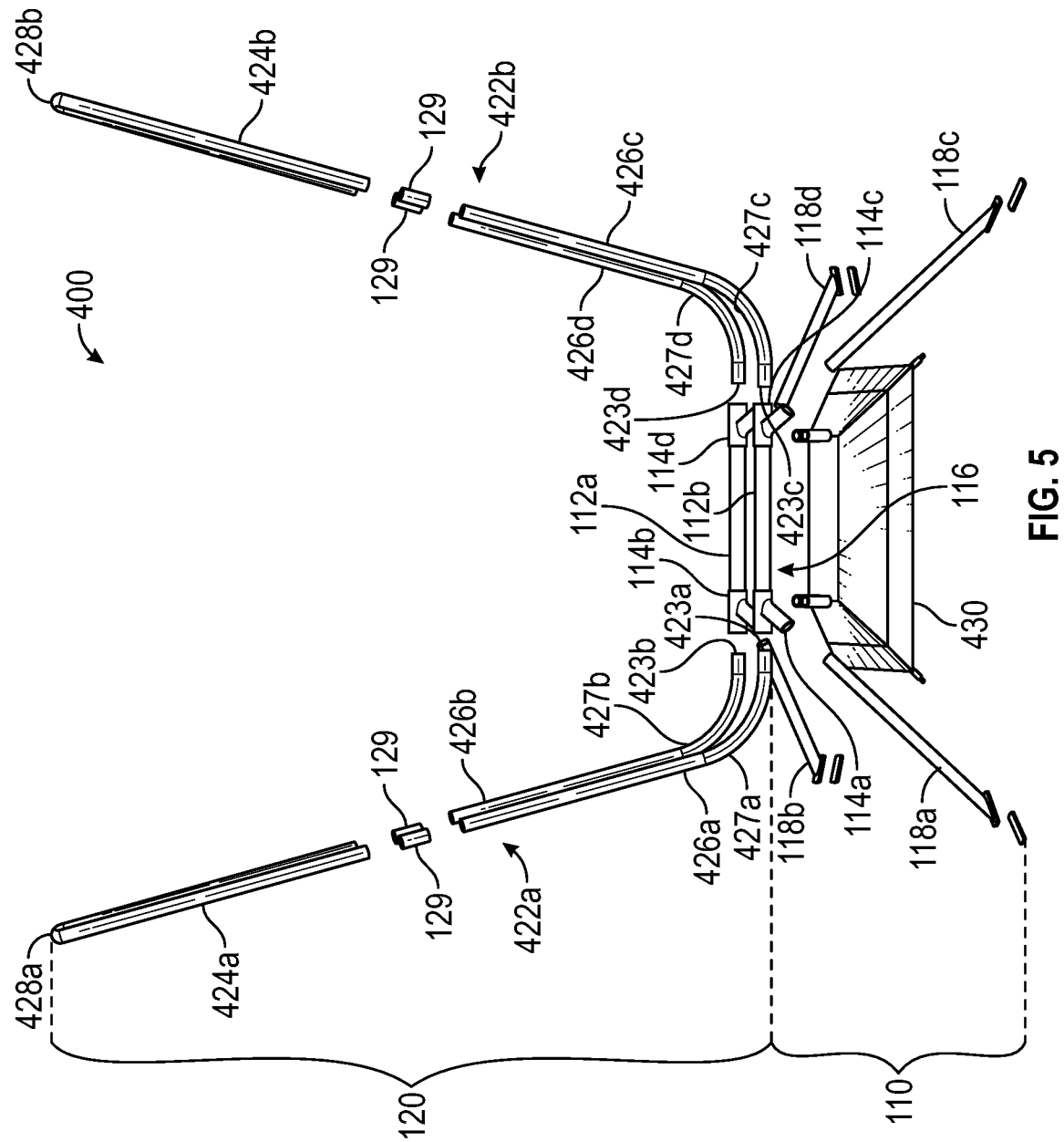

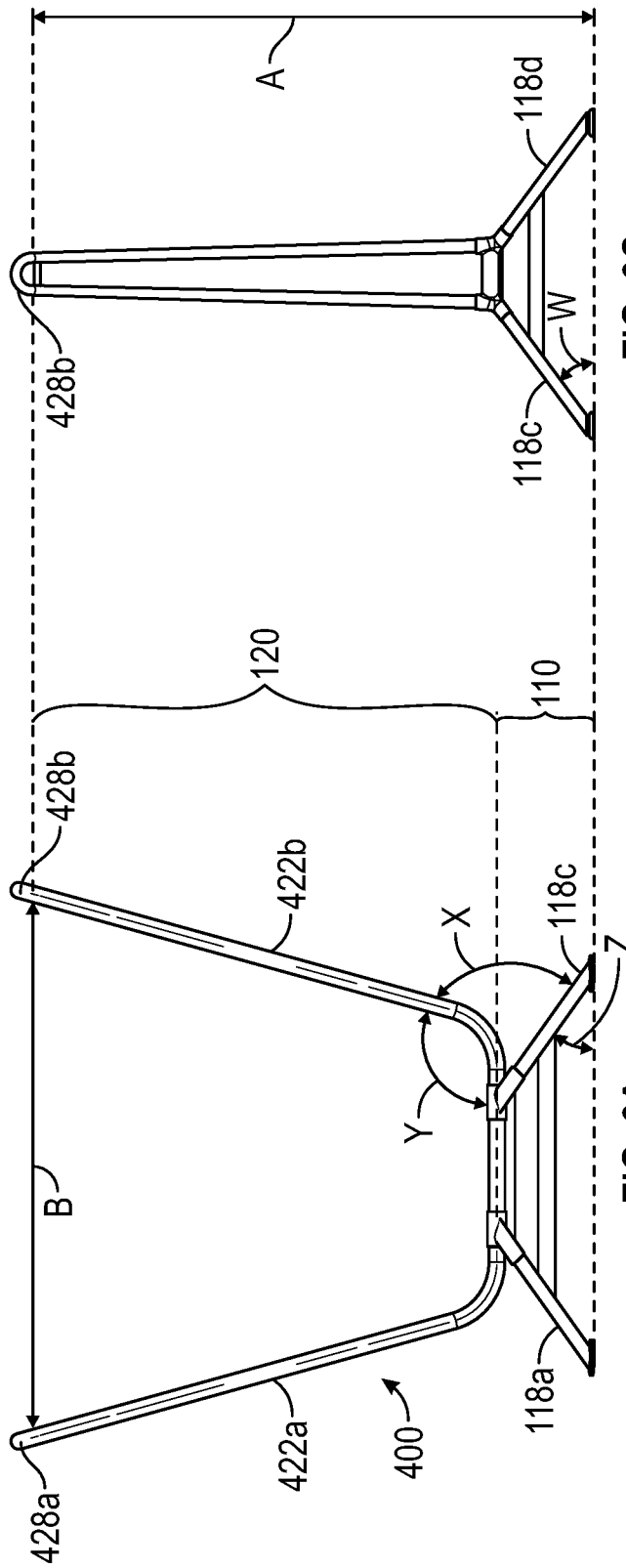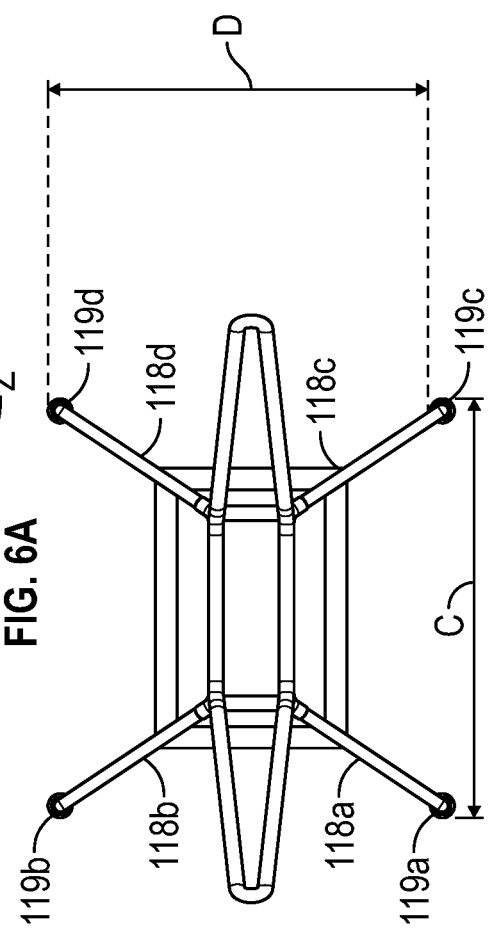

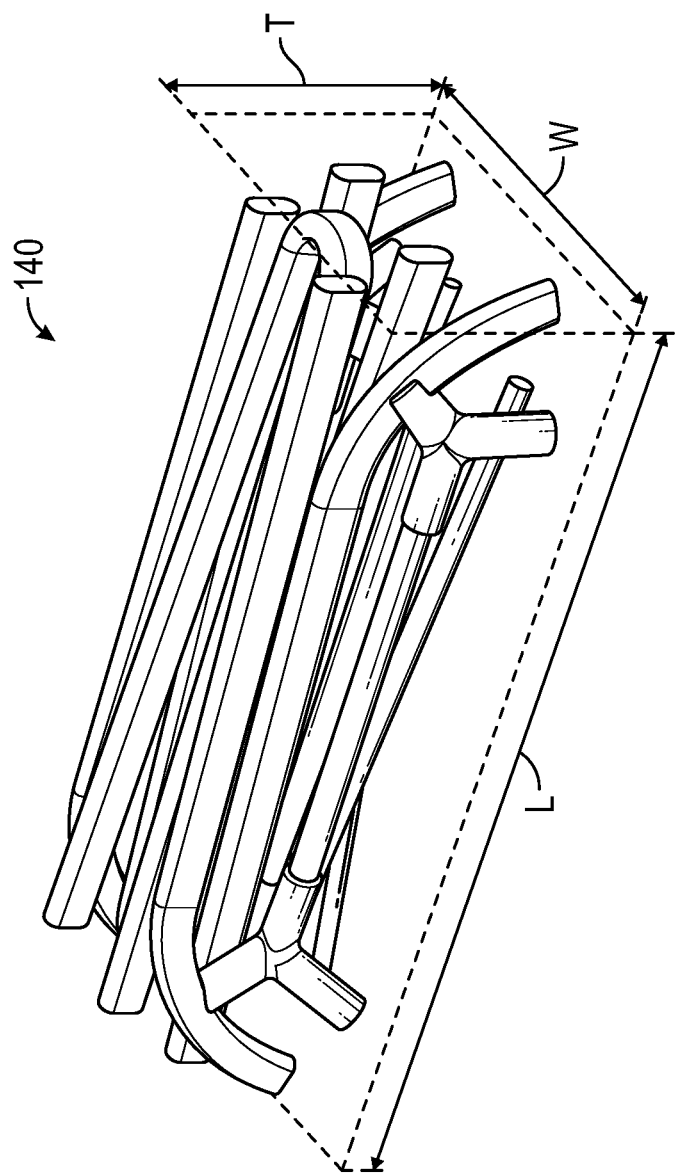

COMPACT COLLAPSIBLE HAMMOCK STAND

CROSS-REFERENCE TO RELATED APPLICATION

This application claims the benefit of U.S. Provisional Application No. 62/924,592, filed Oct. 22, 2019.

BACKGROUND OF THE INVENTION

Field of the Invention

This disclosure relates to a hammock or chair stand. More specifically, this disclosure relates to a compact, collapsible hammock or chair stand having multiple elongate tubular components and associated joints.

Description of the Related Art

Hammocks can be suspended from two points. These two points need to have a certain separation distance to allow for the hammock to hang properly. They also need to be structurally rigid so that separation distance is maintained. Existing stands are large, heavy and typically stationary to meet the requirements described above. Alternatively, when a stand is not accessible (e.g., in the woods, at the beach, tailgating, etc.) there is a lack of hanging options other than properly spaced/sized trees and "spanning" straps.

Even with "spanning straps" one must find properly spaced/sized trees or other immovable structures from which to attach the straps. There are no current solutions for landscapes without trees (beach, parking lot, etc.).

SUMMARY OF THE INVENTION

In one aspect, the present invention is directed to a collapsible stand for a hammock comprising a support structure having a first hub assembly and a second hub assembly coupled by a pair of cross beams; a base portion having four legs removably coupled to, and extended down and away from the support structure to form a pyramidal frustum; and an upright portion having a first upright assembly and a second upright assembly removably coupled to, and extending up and at angles away from the support structure, the first upright assembly and the second upright assembly each having an attachment point at a distal end opposite the support structure.

These and other aspects of the present invention are described in the drawings annexed hereto, and in the description of the preferred embodiments and claims set forth below.

BRIEF DESCRIPTION OF THE DRAWINGS

FIGS. 3A, 3B and 3C are front, top and side views respectively of a further alternative embodiment of the present invention.

FIG. 5 is an exploded perspective view of another alternative embodiment of the hammock stand of the present invention.

FIGS. 6A, 6B and 6C are front, top and side views respectively of the hammock stand of the present invention also shown in FIG. 5.

FIG. 10 is a graphical representation of the embodiment of the hammock stand of the present invention depicted in FIGS. 5 through 6C in the fully disassembled state.

DETAILED DESCRIPTION OF THE PREFERRED EMBODIMENTS

Figure 1:
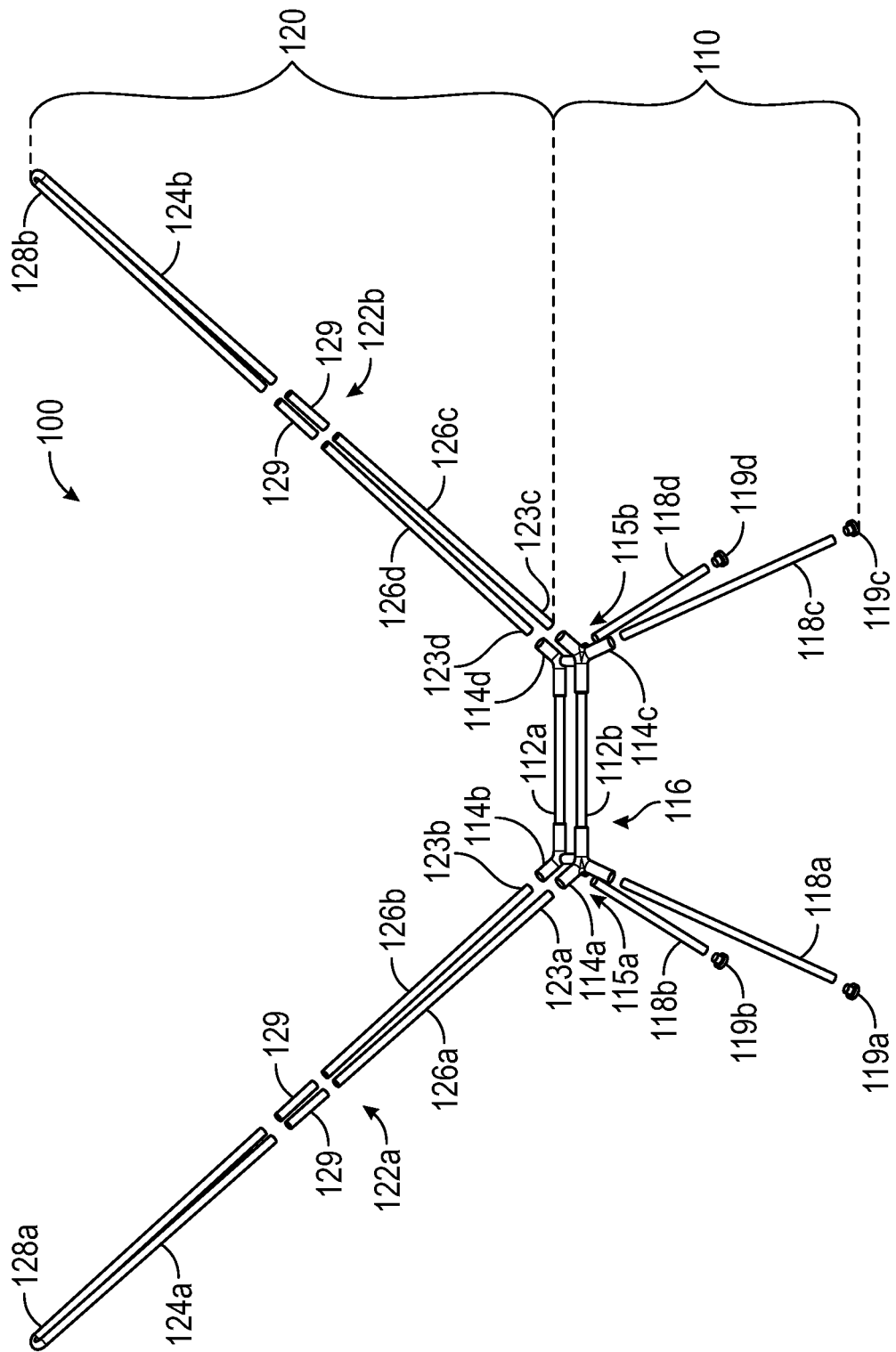
FIG. 1 is an exploded perspective view of an embodiment of the hammock stand of the present invention.

This disclosure is related to a collapsible hammock stand having a series of lightweight tubes that "plug" into rigid "hubs" at fixed angles, the sum of which achieves a structure capable of supporting a suspended hammock at a fixed separation distance.

Reference throughout this specification to "one embodiment," "an embodiment" or "implementation" means that a particular feature, structure, or characteristic described in connection with the embodiment is included in at least one embodiment. Thus, appearances of the phrases "in one embodiment," "in an embodiment," or "in one/an implementation" in various places throughout this specification are not necessarily all referring to the same embodiment or implementation. Furthermore, the particular features, structures, or characteristics may be combined in any suitable manner in one or more embodiments. In the accompanying figures (FIGS. 1-13D), like reference numerals where present in different embodiments refer to like parts.

Referring to FIG. 1, there is shown in exploded form an embodiment of the collapsible hammock stand of the present invention, collapsible hammock stand 100. Collapsible hammock stand 100 has a base portion 110 and an upright portion 120. The upright portion 120 of hammock stand 100, as well as the upright portion 120 of all other hammock stand embodiments disclosed herein (hammock stands 200, 300 and 400), when assembled can support a hammock 102 in an extended position 150, in the manner shown in FIG. 11. The hammock stand 100, as well as all other hammock stand embodiments disclosed herein (hammock stands 200, 300 and 400) can be stored in a disassembled state 140, generally in the manner shown in FIG. 10.

In the embodiment of FIG. 1 and in the other embodiments of the present invention, the base portion 110 generally comprises four support tubes (labeled 112a, 112b, 112c and 112d throughout the drawings, and referenced generically herein simply as support tube or tubes 112). Support tubes 112 are coupled by four hubs (labelled 114a, 114b, 114c and 114d throughout the drawings, and referenced generically as simply hub or hubs 114), to form a rectangular support structure 116. The support structure 116 is held up above the ground by four tubular legs (labelled 118a, 118b, 118c and 118d throughout the drawings, and referenced generically simply as leg or legs 118). In turn, support structure 116 holds up upright portion 120, comprising two upright assemblies, upright assembly 122a and upright assembly 122b (generically referred to simply as upright assembly 122 or upright assemblies 122). As shown in FIG. 1, the upright assemblies 122 can be splayed apart (seen for example in FIGS. 3A and 3B) to receive the hammock 102 (e.g., the seating surface) suspended between.

Each hub 114 of hammock stand 100 includes four relatively short tubular sections, or hub coupling segments. Each hub coupling segment has a first end and a second end. In general, for each of the four hub coupling segments of a given hub 114, the first end of the hub coupling segment is joined to a central location with the first ends of the other hub coupling segments of that hub 114, whereas the second ends of the four hub coupling segments are arranged so as to be separated. In the hammock stand 100 depicted in FIG. 1, the second ends of the four hub coupling segments of each hub 114 are separated in the manner of the corners of a tetrahedron. In the extended position 150, each of the four hub coupling segments of a hub 114 is joined to tubing; i.e., the four hub coupling segments of each of the hubs 114 are joined to two support tubes 112, one tubular leg 118 (see below) and one tubular upright assembly 122 (see below).

More specifically, and referring to FIG. 1, hub 114a is joined to support tube 112d, and additionally receives adjacent support tube 112b, as well as tubular leg 118a of the base portion 110 and tubular straight portion 126a of upright assembly 122a. Similarly, hub 114b is joined to support tube 112d, and additionally receives adjacent support tube 112a, as well as tubular leg 118b of the base portion 110 and tubular straight portion 126b of upright assembly 122a. In turn, hub 114c is joined to support tube 112c, and additionally receives adjacent support tube 112b, as well as tubular leg 118c of the base portion 110 and tubular straight portion 126c of upright assembly 122b; and hub 114d is joined to support tube 112c, and additionally receives adjacent support tube 112a, tubular leg 118d of the base portion 110 and tubular straight portion 126d of upright assembly 122b.

The joining of the hub coupling segments to the associated tubing can be done in alternate ways, in accordance with preference. In some embodiments, such as support structure 116 shown in FIG. 1, the hub coupling segments of the hubs 114 each can have a cylindrical or other suitably-shaped bore (female coupling) sized and formed to have inserted therein and receive the complementary tubular member internally. In some other embodiments, such as support structure 116 shown in FIG. 2, the hub coupling segments, or portions thereof, of the hubs 114 can be sized and formed to be inserted (male coupling) into the tubular end portion of the complementary tubular member. The joining can be permanent (i.e., not intended for disassembly by the user) or removable (user-separable), in accordance with design preference, as described further below.

The four support tubes 112 of base portion 110 can have lengths of two different dimensions forming the rectangular support structure 116. For example, the opposing support tubes 112a, 112b shown in FIG. 1 (also referred to herein as cross beams 112a, 112b, respectively) are longer than the support tubes 112c, 112d. The ratio of the lengths of the opposing support tubes 112a, 112b to the length of the support tubes 112c, 112d can be varied as desired, depending upon the particular application for which the hammock and the hammock stand is intended.

Figure 7A:
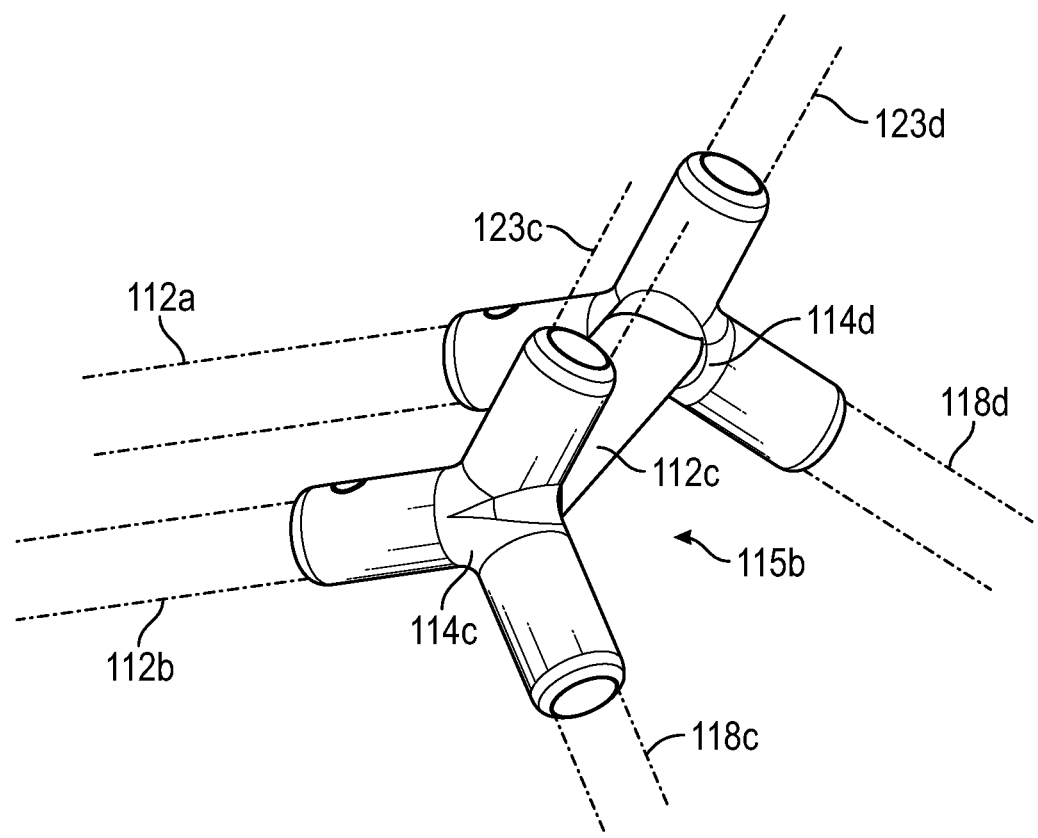
FIG. 7A is a perspective view of a hub assembly utilized in the embodiment of the hammock stand of the present invention depicted in FIG. 1.

The hub 114a, the support tube 112d and the hub 114b when joined together in accordance with this disclosure can be referred to as a hub assembly 115a (as indicated in FIG. 1). Similarly, the hub 114c the support tube 112c and the hub 114d when joined together in accordance with this disclosure can be referred to as a hub assembly 115b (also as indicated in FIG. 1). FIG. 7A depicts hub assembly 115b of hammock stand 100; hub assembly 115a is substantially the same. In the embodiment shown in FIG. 1, and as shown in FIG. 7A, hub assemblies 115a, 115b are each manufactured as a unitary component. However, hub assemblies 115a and 115b each need not be a unitary component, but alternatively can comprise separately made components (i.e., two or more of hub 114a, hub 114b and support tube 112d can be separately made), and then connected in the manner (shown in FIG. 1 and in greater detail in FIG. 7A) in which support tube 112b is received within the appropriate hub coupling segment of hub 114c. The hub assemblies 115a and 115b can then be coupled by the cross beams 112a, 112b to form the support structure 116. In the embodiment shown in FIG. 1, the components of the support structure 116 (hub assemblies 115a, 115b, cross beams 112a, 112b, hubs 114a-d) are permanently affixed; i.e., support structure 116 is not made to be user-disassembled.

Referring to FIGS. 1 and 7A, the hub coupling segments of hubs 114 are structured and oriented so that the four legs 118 of hammock stand 100, when received by the hubs 114, extend at an angle down and away from a center of the base portion 110. The base portion 110 can then form a frustum of a rectangular pyramid. This structure can provide increased strength and a rigid support for the hammock stand 100. Each leg 118 can have a foot (labeled 119a, 119b, 119c, 119d throughout the drawings, and referenced generically as simply foot or feet 119) at an end distal from the hub 114 in which it is received, as shown in FIG. 1. The proximal ends of legs 118a-d (the ends distal from feet 119a-d) can be removably received at, or otherwise removably "plugged into," the hubs 114a-d respectively. The legs 118 can thereby support the support structure 116 a desired distance from the ground.

Still referring to FIG. 1, the hub coupling segments of hubs 114 are further structured and oriented so that upright assemblies 122, when received by the hubs 114, extend up and away from the base portion 110. Upright assembly 122a can have a bent portion 124a joined to two straight portions 126a and 126b, which extend from the hubs 114a and 114b. Similarly, upright assembly 122b can have a bent portion 124b joined to two straight portions 126c and 126d which extend from the hubs 114c and 114d. More particularly, the straight portion 126a can extend from, for example, the hub 114a up and at an angle from the base portion 110 toward a distal end 128a of the bent portion 124a and the entire upright assembly 122a. Similarly, the straight portion 126b can extend from, for example, the hub 114b up and at an angle from the base portion 110 toward the distal end 128a of the bent portion 124a and the entire upright assembly 122a. In turn, the straight portion 126c can extend from, for example, the hub 114c up and at an angle from the base portion 110 toward the distal end 128b of the bent portion 124b and the entire upright assembly 122b, and the straight portion 126d can extend from, for example, the hub 114d up and at an angle from the base portion 110 toward the distal end 128b of the bent portion 124b and the entire upright assembly 122b. The proximal ends 123a and 123b of straight portions 126a and 126b can be removably received at, or otherwise removably "plugged into," the hubs 114a, 114b respectively, and the proximal ends of straight portions 126c and 126d can be removably received at, or otherwise removably "plugged into," the hubs 114c, 114d respectively. The bent portions 124a and 124b each can have a generally U-shaped profile. Each of the straight portions 126a and 126b can be coupled to the bent portion 124a via a tubular coupling 129, as shown in FIG. 1, and each of the straight portions 126c and 126d can be coupled to the bent portion 124b via a tubular coupling 129, also as shown in FIG. 1.

Figure 2:
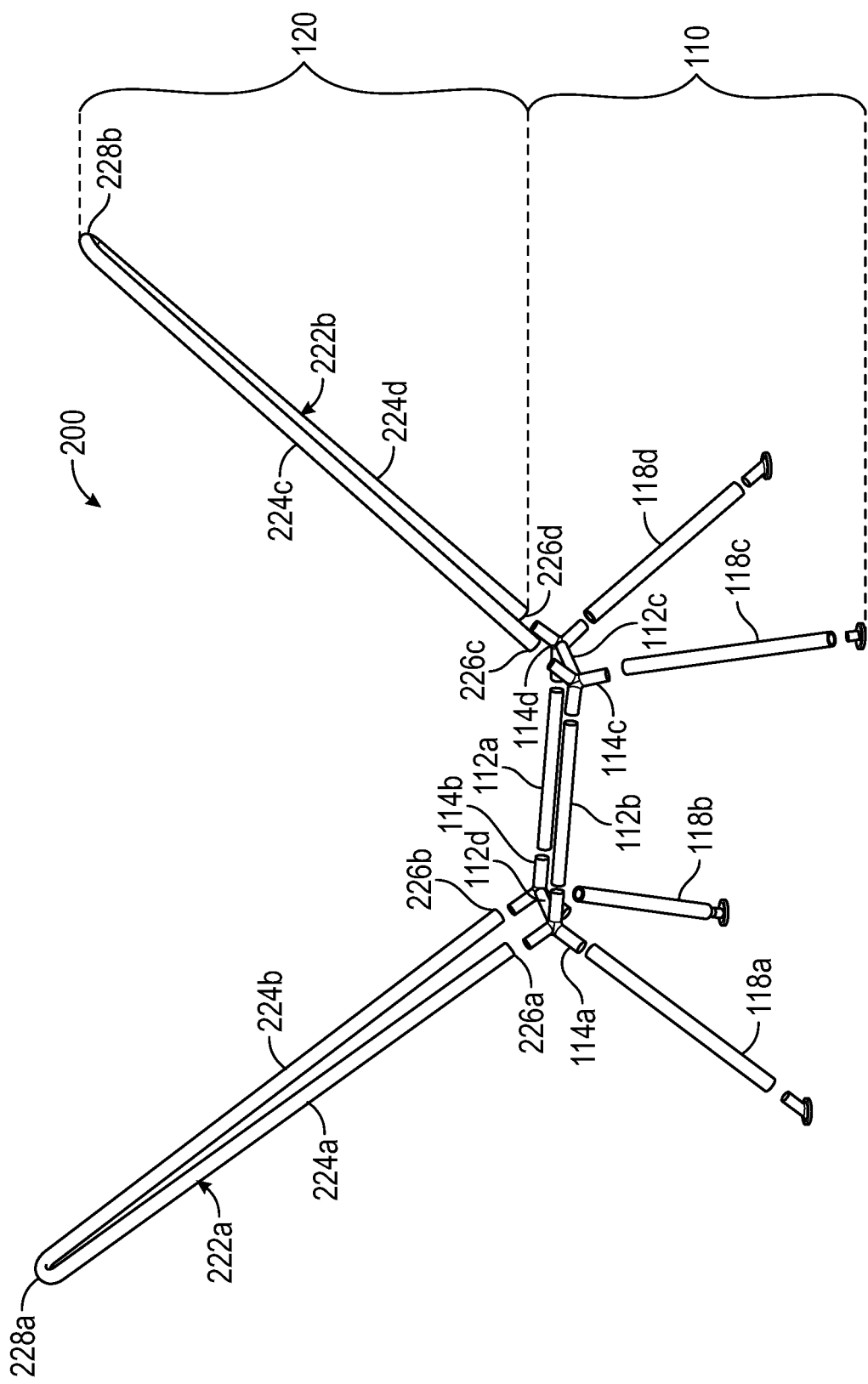
FIG. 2 is an exploded perspective view of an alternative embodiment of the hammock stand of the present invention.

FIG. 2 is an exploded view of another embodiment of a hammock stand of the present invention, hammock stand 200. In comparison to the embodiment shown in FIG. 1, in the embodiment shown in FIG. 2 the upright assemblies 222a and 222b (sometimes referred to generically simply as upright assembly or assemblies 222) are formed in a unitary construction, as opposed to utilizing multiple pieces. Thus, the length of the hammock stand 200 in the disassembled state 140 is longer than that of the hammock stand 100 in the disassembled state 140. The base portions 110 of the hammock stand 100 depicted in FIG. 1 and the hammock stand 200 depicted in FIG. 2 are generally the same in form.

As referenced above, the hammock stand 200 shown in FIG. 2 can have two upright assemblies 222, each having a unitary construction. The upright assemblies 222 can thus each be a tubular member bent into a rounded V-shape or U-shape. The "U" or rounded "V-shape" can vary based on the width of the support structure 116. Referring to FIG. 2, the upright assembly 222a, for example, can have a first straight portion 224a that extends from a first proximal end 226a to a rounded distal end 228a. The upright assembly 222a can also have a second straight portion 224b extending from the rounded distal end 228a and then back toward a second proximal end 226b. Comparably, the upright assembly 222b, for example, can have a first straight portion 224c that extends from a first proximal end 226c to a rounded distal end 228b (distal end 228a and distal end 228b are referred to generically simply as distal end or ends 228). The upright assembly 222b can also have a second straight portion 224b extending from the rounded distal end 228b and then back toward a second proximal end 226b. The first and second proximal ends 226a, 226b of upright assembly 222a can be removably received at, or otherwise removably "plugged into," the hubs 114a, 114b respectively, and the first and second proximal ends 226c, 226d can be removably received at, or otherwise removably "plugged into," the hubs 114c, 114d respectively. Apart from the upright assemblies 222 as described above, the hammock stand 200 described in reference to FIG. 2 is substantially the same as hammock stand 100 described in reference to FIG. 1.

FIGS. 3A, 3B and 3C depict another embodiment of the invention, hammock stand 300. In hammock stand 300, the upright assemblies 322 (e.g., upright assembly 322a and upright assembly 322b) can have, for example, multiple components. Thus upright assembly 322a comprises two straight portions 324a, 324b, which are joined by a curved coupling 329a, which is received at, or otherwise "plug into," one or both of straight portions 324a, 324b, and upright assembly 322b comprises two straight portions 324c, 324d, which are joined by a curved coupling 329b which is received at, or otherwise "plug into," one or both of straight portions 324c, 324d.

Hammock stand 300 has generally the same overall geometry as hammock stand 200 shown in FIG. 2 and hammock stand 100 shown in FIG. 1. Accordingly, hammock stand 300 as shown in FIGS. 3A-3C provides exemplary physical dimensions which are also applicable to hammock stand 100 and hammock stand 200. Therefore, certain components described herein may not be shown in detail. The physical dimensions for hammock stands 100 and 200 can be varied in accordance with their intended usages, consistent with the teachings herein.

Referring to FIG. 3C, the hammock stand 300 can stand a distance "A" approximately 46 inches off the ground (e.g., 46.75"), measured from the distal ends 328a, 328b. As shown in FIG. 3A, the upright portion 120 and the base portion 110 can be relatively positioned at an angle "X" of approximately 110-120 degrees (e.g., 112 degrees), when viewed in profile from the front (e.g., front elevation view as shown in FIG. 3A). Similarly, the legs 118 can be situated at an angle "Z" of approximately 60-70 degrees (e.g., 63 degrees) from the ground when viewed from the front (i.e., front elevation view as shown FIG. 3A), and at an angle "W" of approximately 50-60 degrees (e.g., 52 degrees) when viewed from the side (i.e., side elevation view as shown in FIG. 3C).

The upright assemblies 322 can further form an angle "Y" of approximately 130-140 degrees (e.g., 131 degrees) from the cross beams 112a, 112b of the base portion 110, as shown in FIG. 3A. This can provide a distance "B" of approximately 72 inches between the distal end 328a and the distal end 328b of the upright assemblies 322, as shown in FIG. 3A. As shown in FIG. 3B, dimension "C", the distance between feet 119a and 119c of hammock stand 300, and between feet 119b and 119d, is approximately thirty inches (e.g., 30.4"); and dimension "D", the distance between feet 119a and 119b, and between feet 119c and 119d, is approximately twenty eight inches (e.g., 27.5"). In some embodiments, these dimensions can accommodate a hammock chair for a user sitting transverse to an imaginary line between the distal ends (328a, 328b in FIG. 3A). For example, the base portion 110 of hammock stand 100, shown in FIG. 1, may be appropriate to support a hammock to be utilized in the sitting position. In some other embodiments, these dimensions can be expanded by, for example, extending the dimensions of the cross beams 112a, 112b, as exemplified by the hammock stand 300 in FIG. 4B. Accordingly, some implementations of the hammock stand of the present invention can accommodate a laying hammock, in which the user lies down along the imaginary line connecting the distal ends (328a, 328b in FIG. 4B).

The dimensions depicted in FIGS. 3A-3C are exemplary and are not limiting on the disclosure. The dimensions of hammock stand 300 shown and described in connection with FIGS. 3A-3C can be applied to both the hammock stand 100 (FIG. 1) and the hammock stand 200 (FIG. 2).

Figure 4A:
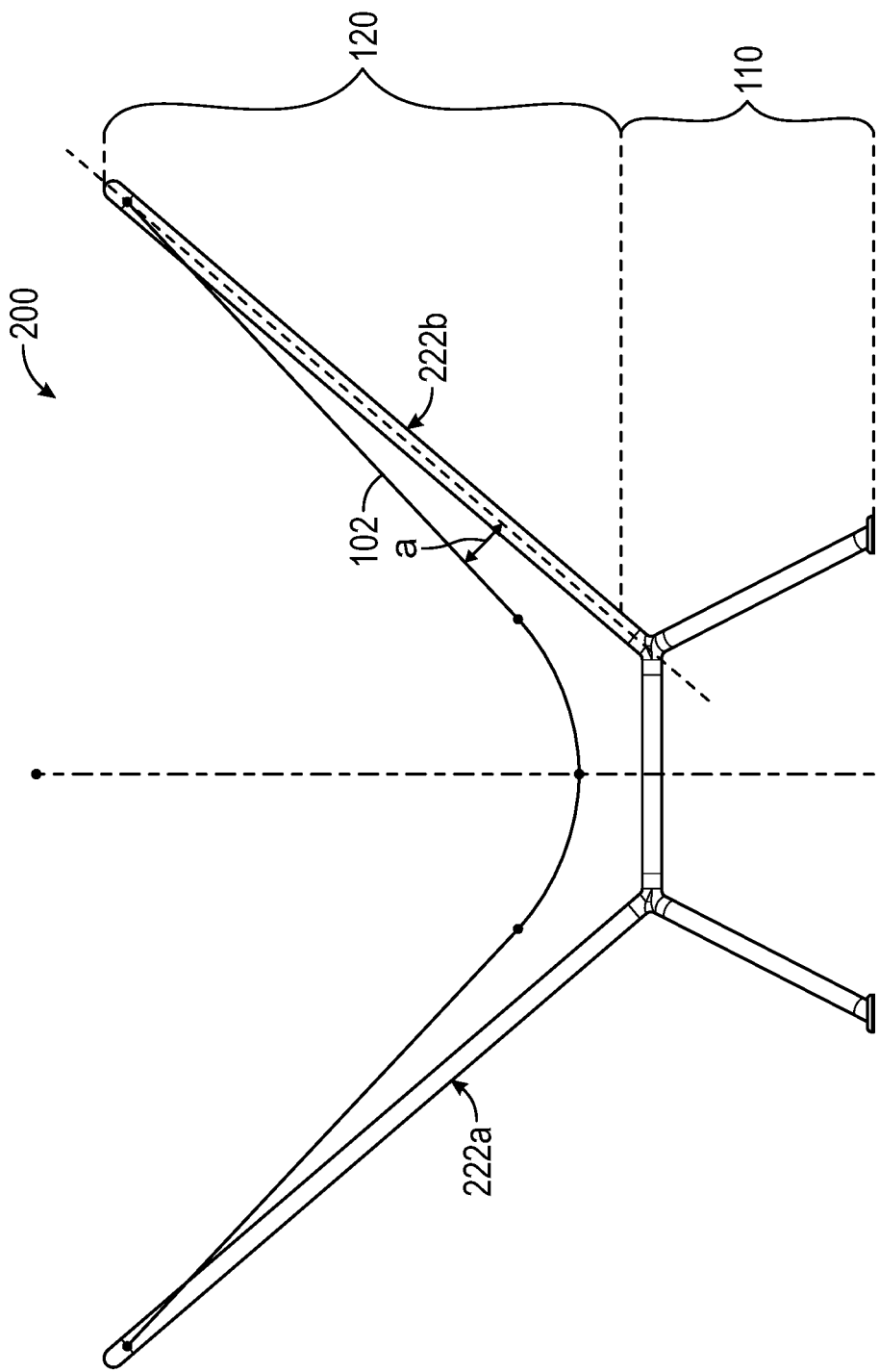
FIG. 4A is a front view of a graphical depiction of a mathematical model used to define the dimensions of the embodiments of the hammock stands of FIGS. 1 through 3A-3C.
Figure 4B:
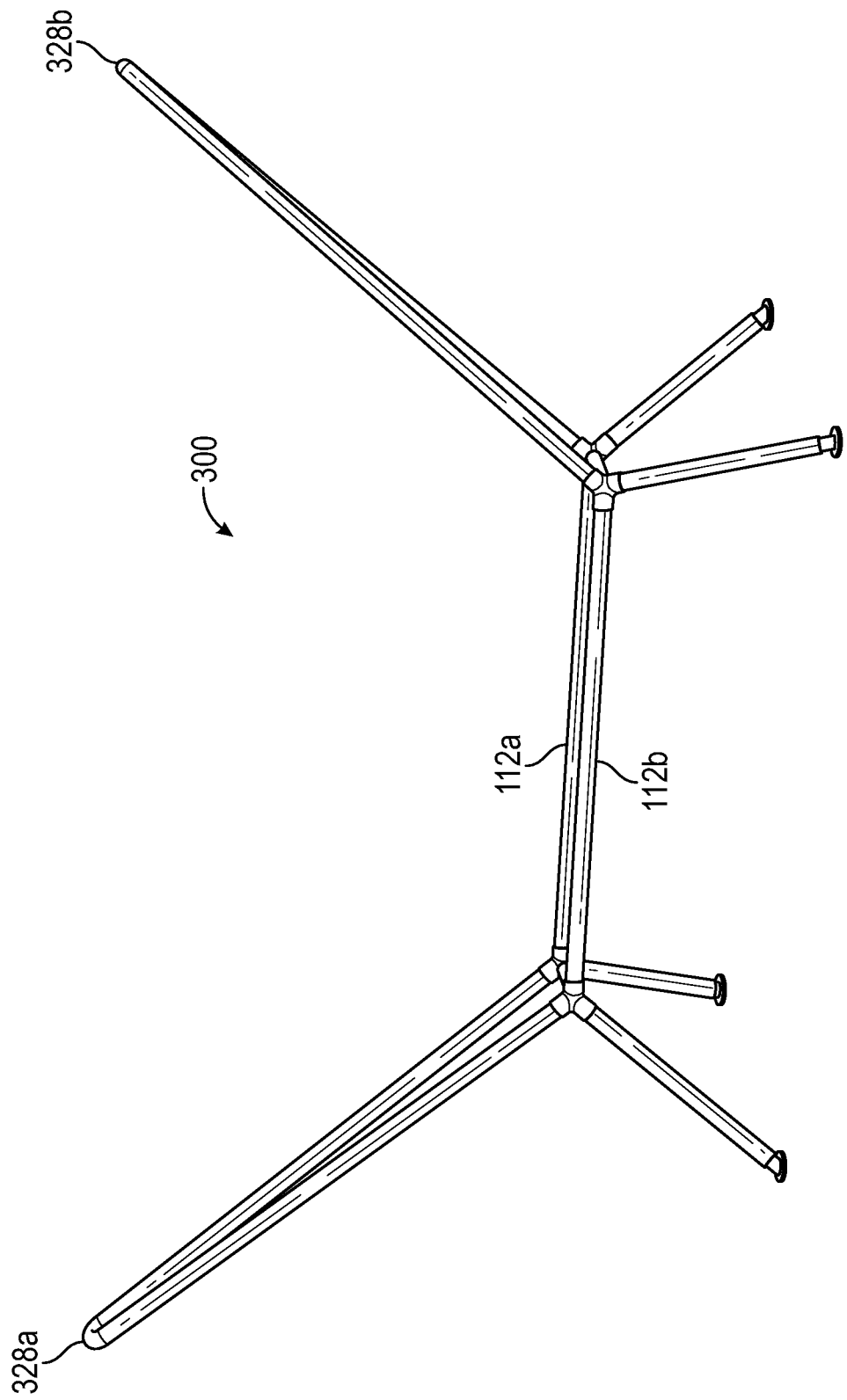
FIG. 4B is a perspective view of a hammock stand of the present invention with a support structure having lengthened cross beams.

FIG. 4A is a graphical depiction of a mathematical model used to define the dimensions of the embodiments of the hammock stands depicted in FIGS. 1 through 3C, utilizing hammock stand 200 for exemplary purposes. As shown, the hammock 102 (represented as a single line) can be displaced by a displacement angle α from each of the upright assemblies 222 (exemplified in respect of upright assembly 222b in FIG. 4A) when under load. The example shown in FIG. 4A depicts a small relative angle α between the hammock 102 and the upright assembly 222b shown. The smaller the angle α, the (e.g., between the upright assembly and the suspended seat or hammock 102) the more compression load is imparted on the upright assemblies 222, minimizing shear load. However, a small angle α (e.g., 1-10 degrees) between the upright assemblies 222 and the hammock can provide a safety factor. In some embodiments, the angle α can be 8 degrees.

FIG. 5 depicts a further embodiment of the present invention, hammock stand 400. The upright portion 120 of hammock stand 400 comprises two upright assemblies, upright assembly 422a and upright assembly 422b (generically referred to simply as upright assembly 422 or upright assemblies 422). The upright assemblies 422 can be splayed apart (seen for example in FIGS. 5 and 6A) to receive the hammock 102 (e.g., the seating surface) suspended between.

Upright assembly 422a as shown in FIG. 5 can have a bent distal portion 424a joined to two bent proximal portions 426a and 126b which extend from the hubs 114a and 114b, and upright assembly 422b can have a bent distal portion 424b joined to two bent proximal portions 426c and 426d which extend from the hubs 114c and 114d. More particularly, the bent proximal portion 426a as shown in FIG. 5 can extend from the hub 114a, initially in a horizontal direction, and then curve upward through curved portion 427a to extend up at an angle from the base portion 110 toward a distal end 428a of the bent distal portion 424a and the entire upright assembly 422a. Similarly, the bent proximal portion 426b as shown in FIG. 5 can extend from the hub 114b initially in a horizontal direction, and then curve upward through curved portion 427b to extend up at an angle from the base portion 110 toward the distal end 428a of the bent distal portion 424a and the entire upright assembly 422a. In turn, the bent proximal portion 426c as shown in FIG. 5 can extend from the hub 114c, initially in a horizontal direction, and then curve upward through curved portion 427c to extend up at an angle from the base portion 110 toward a distal end 428b of the bent distal portion 424b and the entire upright assembly 422b, and the bent proximal portion 426d as shown in FIG. 5 can extend from the hub 114d, initially in a horizontal direction, and then curve upward through curved portion 427d to extend up at an angle from the base portion 110 toward the distal end 428b of the bent distal portion 424b and the entire upright assembly 422b.

The proximal ends 423a and 423b of bent proximal portions 426a and 426b can be removably received at, or otherwise removably "plugged into," the hubs 114a, 114b respectively, and the proximal ends 423c and 423d of straight portions 426c and 426d can be removably received at, or otherwise removably "plugged into," the hubs 114c, 114d respectively. The bent distal portions 424a and 424b each can have a generally U-shaped profile. Each of the bent proximal portions 426a and 426b can be coupled to the bent distal portion 424a via a tubular coupling 129, as shown in FIG. 5, and each of the bent proximal portions 426c and 426d can be coupled to the bent distal portion 424b via a tubular coupling 129, also as shown in FIG. 5.

Figure 7B:
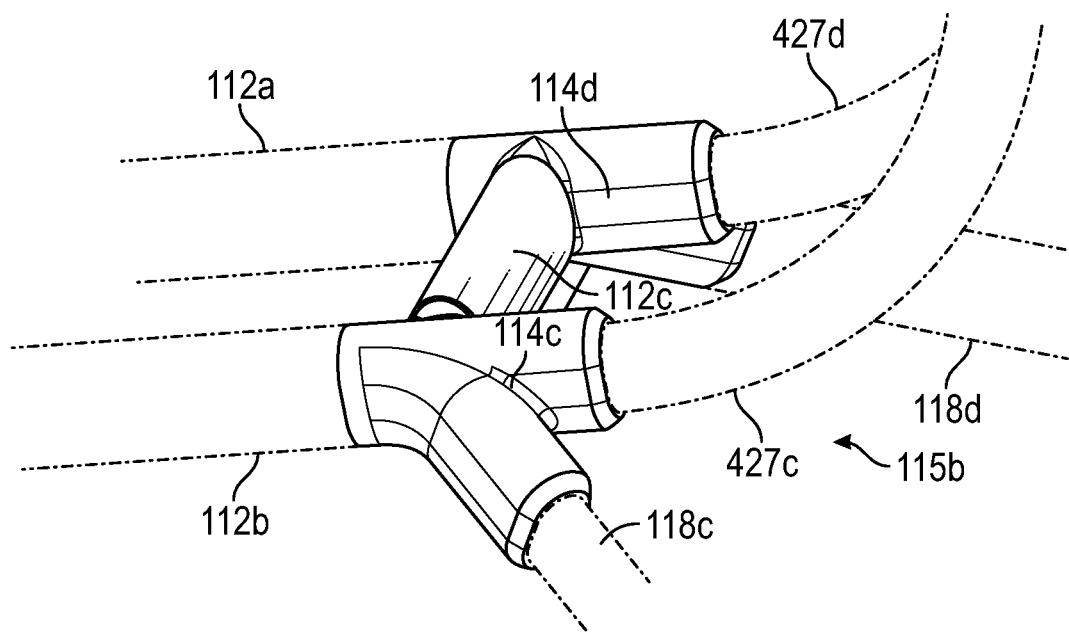
FIG. 7B is a perspective view of a hub assembly utilized in the embodiment of the hammock stand of the present invention depicted in FIGS. 5 through 6C.

FIG. 7B depicts hub assembly 115b of hammock stand 400; hub assembly 115a is substantially the same. As can be seen, the hubs 114 of hammock stand 400 differ from the hubs 114 of hammock stand 100, in that the hub coupling segments of hubs 114 are constructed and oriented to receive bent proximal portions 426 at a horizontal angle. In the embodiment shown, hub assemblies 115a, 115b are each manufactured as a unitary component. The hub assemblies 115a and 115b can then be coupled by the cross beams 112a, 112b to form the support structure 116. In the embodiment shown in FIGS. 5 and 6A-C, the components of the support structure 116 are permanently affixed; i.e., support structure 116 is not made to be user-disassembled. Alternatively, that support structure can be made to be user disassemblable, as preferred.

The hammock stand 400 shown in FIG. 5 is provided with a storage compartment 430. Storage compartment 430 can be formed of a flexible material or fabric, such as 600 denier polyester mesh, can be removably secured to base portion 110 with metal snaps, Velcro bands and the like, as desired, and can be provided with openable access apertures, such as zippers.

Physical dimensions for hammock stand 400 shown can be varied in accordance with the intended usage of stand 400, consistent with the teachings herein. One set of exemplary dimensions is provided with reference to FIGS. 6A-C. Referring to FIG. 6C, the hammock stand 400 can stand a distance "A" approximately 52 inches off the ground (e.g., 52.11"), measured from the distal ends 428a, 428b. As shown in FIG. 6A, the upright portion 120 and the base portion 110 can be relatively positioned at an angle "X" of approximately 110-120 degrees (e.g., 115 degrees), when viewed in profile from the front (e.g., front elevation view). Similarly, the legs 118 can be situated at an angle "Z" of approximately 35-45 degrees (e.g., 39 degrees) from the ground when viewed from the front (e.g., front elevation view shown in FIG. 6A) and at an angle "W" also of approximately 35-45 degrees (e.g., 39 degrees) from the ground when viewed from the side (i.e., side elevation view shown in FIG. 6C).

The upright assemblies 422 can further form an angle "Y" of approximately 100-110 degrees (e.g., 104 degrees) from the cross beams 112a, 112b of the base portion 110, as shown in FIG. 6A. For the embodiment of FIGS. 6A-C, this can provide a distance "B" of approximately 46 inches (e.g., 46.15 inches) between the distal end 428a and the distal end 428b of the upright assemblies 422, as shown in FIG. 6A. As shown in FIG. 6B, dimension "C", the distance between feet 119a and 119c of hammock stand 400, and between feet 119b and 119d, can be approximately thirty five to thirty seven inches (e.g., 36.54"); and dimension "D", the distance between feet 119a and 119b, and between feet 119c and 119d, can be approximately twenty eight to thirty inches (e.g., 29.46").

In general, each of the hammock stands 100, 200, 300 and 400 can be a lightweight device having relatively small diameter tubing used for the components described above. For example, all tubular members (126a-d, 124a-b, etc.) can be fabricated from tubing having a circular cross-section of a diameter of 20 mm or more, with a wall thickness of approximately 2 mm. Other cross-sections can be utilized in accordance with design preference; thus upright assemblies 422 and legs 118 of hammock stand 400 (see FIG. 6) for example can utilize a rectangular cross-section with rounded corners (rounded rectangular cross-section) approximately 29 mm by 17 mm. Suitable materials for the tubular members include aluminum alloy, carbon fiber, wood, wood laminates, and the like. Suitable materials for hubs 114 include glass filled nylons.

A feature of the hammock stands 100, 200, 300 and 400 is that they can be rapidly and easily disassembled and assembled. To facilitate this disassembly and assembly, select components (legs 118a-d and straight portions 126a-126d in the embodiment of FIG. 1, straight portions 224a-d in the embodiment of FIG. 2, etc.), can be removably coupled to the hubs 114 as by being removably "plugged into" the hubs 114 as described above. Such removable coupling can be implemented with a quick-disconnect or similar connecting component, or by means of an interference fit, a press fit, or a friction fit, as can be effected for example where the hub coupling segments of hubs 114 have an internal diameter that is substantially equal to the outer diameter of the associated tubes. Removably coupling the components of hammock stands 100, 200, 300 and 400 provides for a product that can be disassembled, and which in the disassembled state 140 is compact and easily moved.

In some exemplary implementations of the hammock stand 100, 200, 300 and 400, at least portions of the support structure 116 can be formed as unitary components, according to preference, while still achieving a disassembled hammock stand that is compact. In the embodiments of FIGS. 1, 2, 3 and 5, the eight components of the rectangular support structure 116 are fixedly formed from the hubs 114 and the support tubes 112; i.e., they are permanently coupled to form the rectangular support structure 116 via rivets, bolts, adhesive, welding, casting, etc. Alternatively, two or more of the eight components (e.g., of the support structure 116) can be permanently coupled to form sub-assemblies of the support structure 116 via rivets, bolts, adhesive, welding, casting, etc., with the balance of the eight components being removably coupled in position. In yet other implementations, all components of the support structure 116 can be removably coupled to form support structure 116.

Figures 8A, 8B:
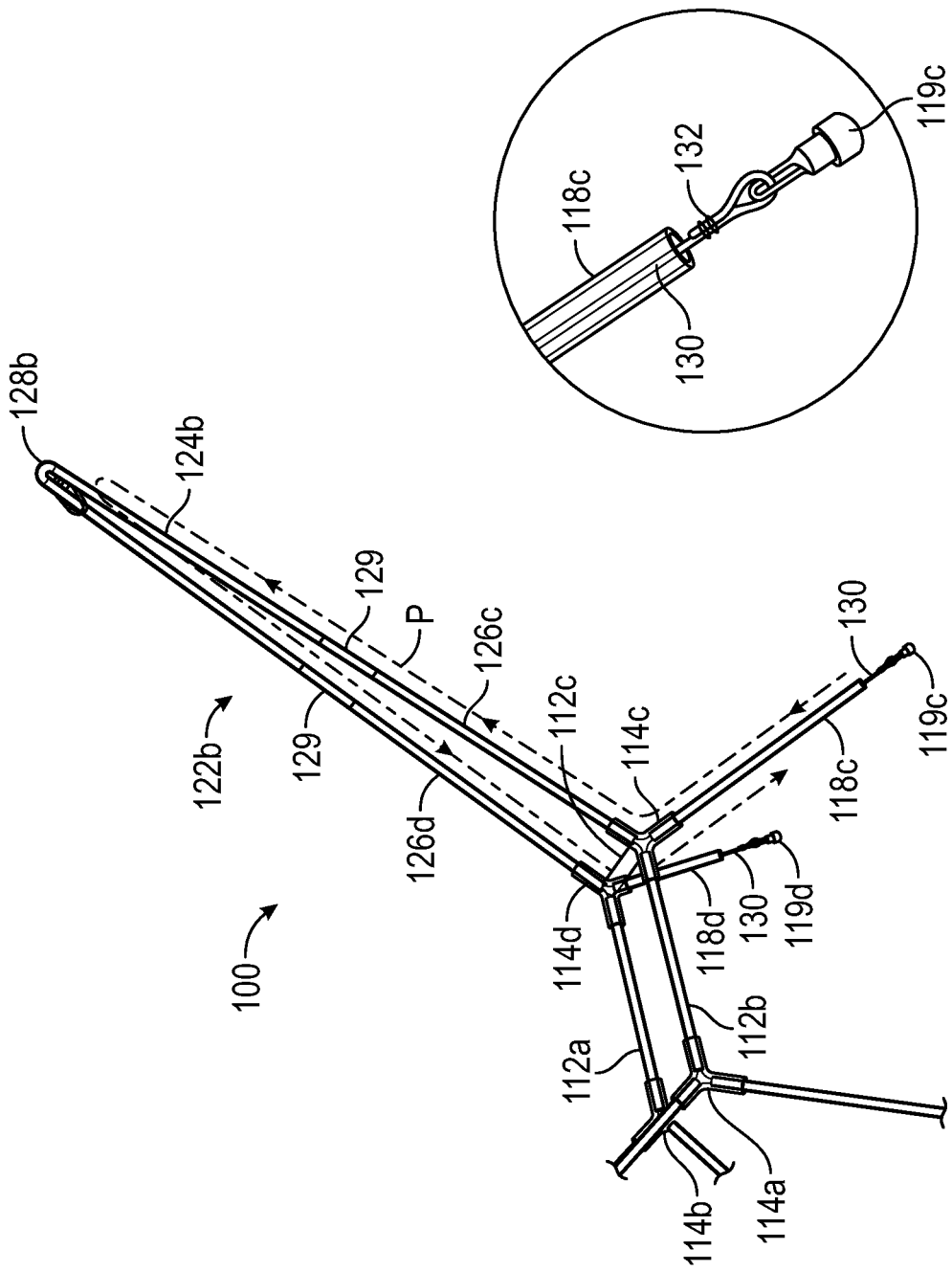
FIG. 8A is a perspective view of a portion of the embodiment of the hammock stand of the present invention shown in FIG. 1.
FIG. 8B is a detailed view of the leg of that embodiment and its associated foot.
Figure 9:
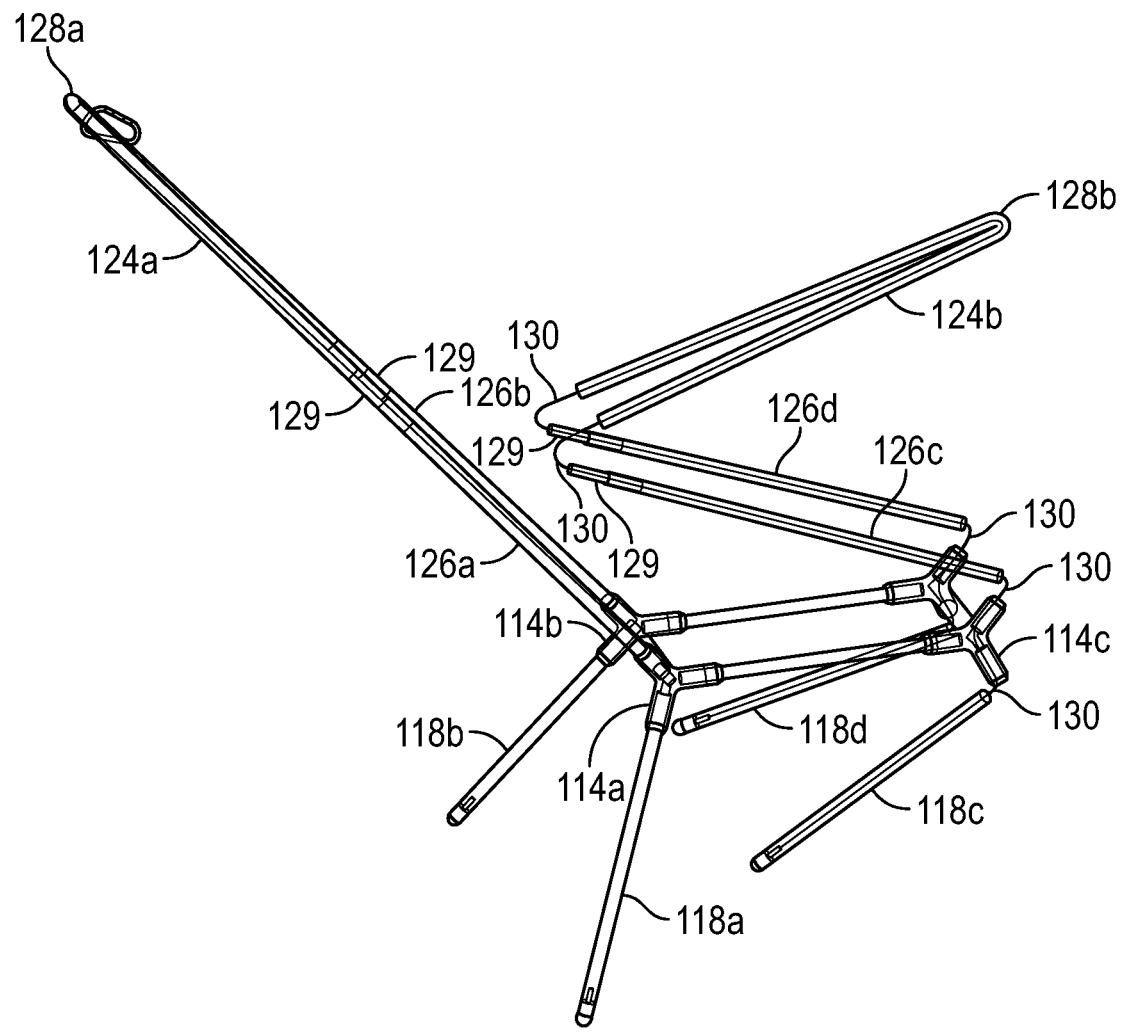
FIG. 9 is a graphical depiction of the embodiment of the hammock stand of FIG. 8A being disassembled.

To further assist in rapid assembly, reference is made to FIG. 8A, which depicts for exemplary purposes a portion of the embodiment of the hammock stand 100 depicted in FIG. 1, and reference is made to FIG. 9, which depicts for exemplary purposes the embodiment of the hammock stand 100 being moved into the disassembled state 140 shown in FIG. 10. As shown in FIG. 8A, the hammock stand 100 can be provided with coupling cord 130 that passes internally through appropriate portions of the hammock stand 100. The coupling cord 130 can be an elastic cord (e.g., bungee cord) that couples opposite pairs of the feet 119 via a channel formed within the components of the hammock stand 100. Referring to FIG. 8A, the coupling cord 130 can extend from the foot 119c through the leg 118c, through the hub 114c, the upright assembly 122b, the hub 114d, and terminate at the foot 119d. Each of the hubs 114 can be provided with an appropriate interior channel through which the coupling chord 130 can pass, as can be observed in FIG. 9. The shape of the path internally through these components is generally described by path "P", shown in FIG. 8A.

The coupling cord 130 can be affixed to a foot 119 at each end (depicted using foot 119c in FIG. 8B for exemplary purposes), as by passing a loop through an aperture in foot 119 and press-fitting the end of the loop to coupling cord 130 using a crimped compression sleeve 132, as shown in FIG. 8B. Thus, when the hammock stand 100 is being manipulated into the disassembled state 140, as shown in FIG. 9, the individual components of the upright assembly 122, the legs 118 and the hubs 114 remain coupled via the coupling cord 130, making assembly of the collapsible hammock stand 100 a quick process. For purposes of disassembly, the legs 118 and the upright assemblies 122 (or the upright assemblies 222, 322) can be removably received at or within the hubs 114.

Only one side of the hammock stand 100 is shown in FIG. 8A. However, both sides of the hammock 100 can have its own coupling cord 130. Thus, a second coupling cord 130 can extend from the foot 119a through the leg 118a, the hub 114ac, the upright assembly 122a, the hub 114b, the leg 118b and terminate at the foot 119b.

The coupling cord 130 can also be implemented in connection with the hammock stand 200, 300 and 400, maintaining desired connections when in the disassembled state 240.

FIG. 9 depicts the folding process for the hammock stand 100 when hammock stand 100 utilizes coupling chord 130. However, the same process can be implemented with hammock stand 400, and also with hammock stands 200 and 300, in which the upright assemblies 222, 322 are not disassemblable into multiple sections as in hammock stand 100. This can result larger dimensions of the hammock stand 200, 300 when in the disassembled state 240, as described below in connection with FIG. 10.

FIG. 10 is a graphical representation of dimensions of the hammock stand 400 of FIGS. 5 through 6C in the disassembled state 140. As shown in FIG. 10, the disassembled state 140 of the hammock stand 400 can have a length "L" measuring approximately twenty-six inches long, a thickness "T" measuring approximately ten inches tall, and a width "W" measuring approximately ten and one half inches wide. In comparison, the components of hammock stand 100 (shown in FIG. 1), when separated and superposed in a disassembled state 140 similar to hammock stand 400 shown in FIG. 10, can have a length "L" measuring approximately twenty-eight inches long, a thickness "T" measuring approximately six inches tall, and a width "W" measuring approximately ten inches wide. These measurements are exemplary and are not limiting on the disclosure. Also in comparison, the components of hammock stand 200 (shown in FIG. 2), when separated and superposed in a disassembled state 140 similar to hammock stand 400 shown in FIG. 10, can measure approximately 45 inches long, by six inches tall, by 10 inches wide. Here too, these measurements are exemplary and are not limiting on the disclosure.

As an alternative to coupling cord 130, the hubs 114 and the tubes coupled to the hubs (e.g., the legs 118 and for example the upright assemblies 122, 222) can be coupled using a spring (e.g., a Valco spring) to couple adjacent members. As a further alternative, the hubs 114 and the tubes coupled to the hubs (e.g., the legs 118 for example and the upright assemblies 122, 222) can be independent components and not coupled by the coupling cord 130 or spring.

Figures 11, 12:
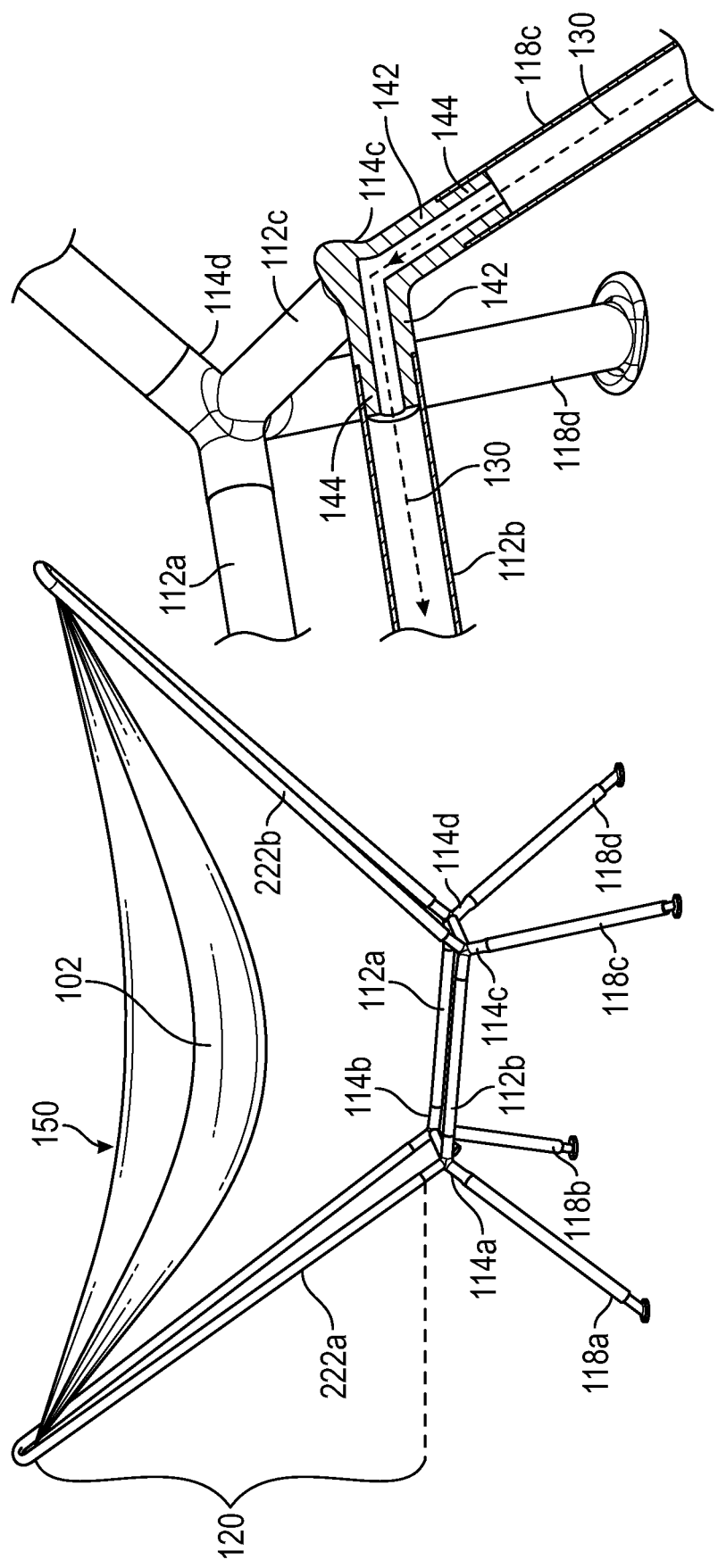
FIG. 11 is a perspective view of the hammock stand of the present invention, with all components assembled and supporting a hammock.
FIG. 12 is a cross section of a portion of the hammock stand of the present invention showing in part an alternate path for a coupling chord.

FIG. 12 is a cross section of a portion of an embodiment of the hammock stand 200 of FIG. 2 (shown more fully in FIG. 11), although the following description applies to the other embodiments of the hammock stand of the present invention as well (hammock stands 100, 300 and 400). As shown in FIG. 12, the hubs 114 can utilize hub coupling segments 142 having outer dimensions (e.g., an outer diameter) substantially equal to that of the tubes forming the legs 118, the support tubes 112a, 112b (for example) of rectangular support structure 116, and/or the upright assemblies 122, 222, with press-fitted connections for example forming separable or permanent joints (not user-separable). The hubs 114 can therefore mate with the associated tubes of the other connecting components and have a substantially continuous external surface across the respective joints. In addition, the hub coupling segments 142 of hubs 114 each can have a distal end 144 having outer dimensions (e.g., outer diameter) substantially equal to an inner diameter of the connecting tubes. This can increase the structural support of the connections made to the hubs 114. (A comparable design implementation is shown in FIG. 7B, in regard to support tubes 112a, 112b and the respective hubs 114d, 114c of hammock stand 400). Similar to the implementations described in connection with FIG. 9, the hubs 114 can have an interior channel through which the coupling cord 130 can pass, as shown in FIG. 12.

FIG. 12 also depicts in part an alternative path for coupling chord 130, different from that depicted in FIG. 8A and FIG. 9. For example, the coupling cord 130 can pass from a first foot 119c, through a first leg 118c, a first hub 114c, a support tube 112b, a second hub 114a, a second leg 118a, and can terminate at a second foot 119a. In similar manner, a second coupling can pass from a first foot 119d, through a first leg 118d, a first hub 114d, a support tube 112a, a second hub 114b, a second leg 118b, and can terminate at a second foot 119b. Thus, in the implementation of FIG. 12, the coupling cord 130 does not pass through the upright assembly 222. Although described in connection with an embodiment in which the upright assemblies are each formed in a unitary construction, this coupling cord path can be used in embodiments in which the upright assembly is formed from multiple components, or is not a unitary element, such as upright assemblies 422 used for example in hammock stand 400, shown in FIGS. 5 and 6A-6C, and where the upright assembly has a coupling at the distal end, such as upright assemblies 322 of hammock stand 300, shown in FIGS. 3A-3C, which have curved couplings 329 at distal ends 328.

Figure 13A:
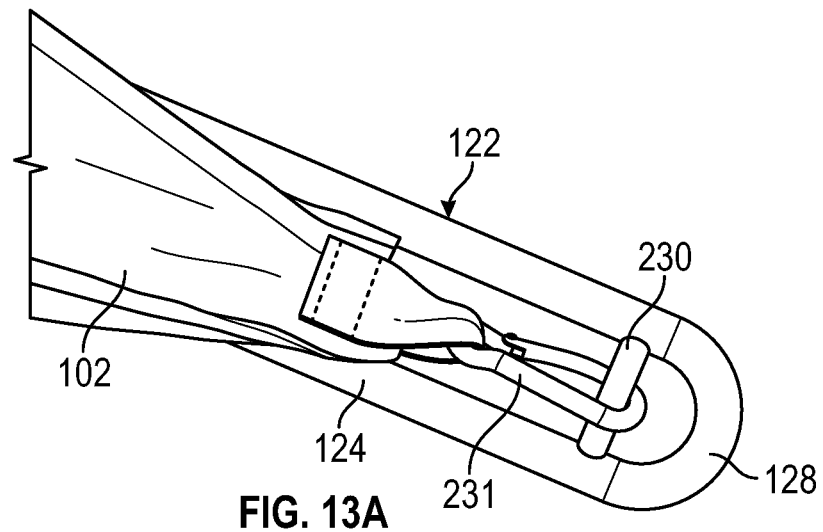
FIGS. 13A, 13B, 13C and 13D depict alternative systems for mounting a hammock to the hammock stand of the present invention.
Figure 13B:
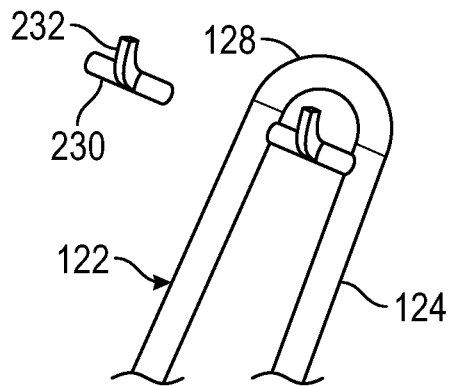
Figure 13C:
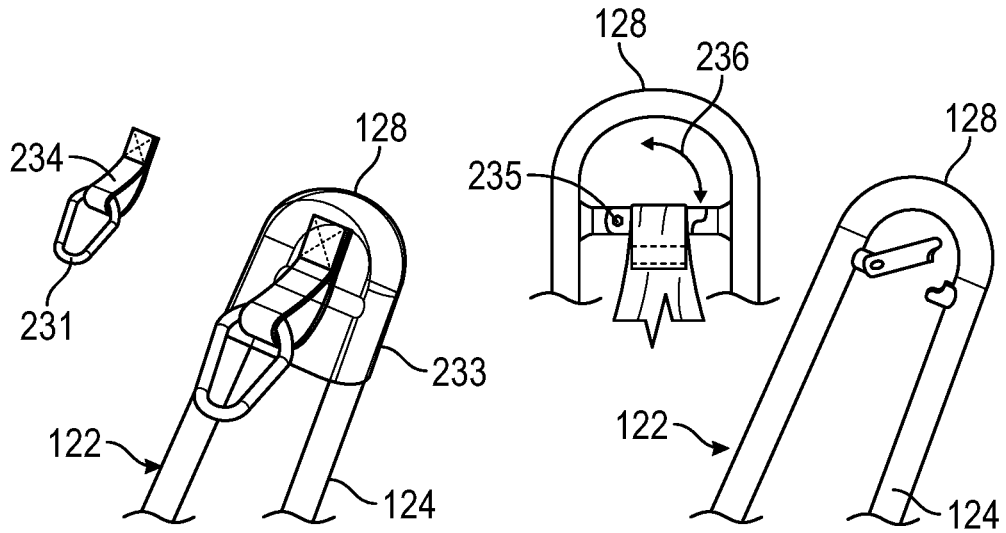
Figure 13D:
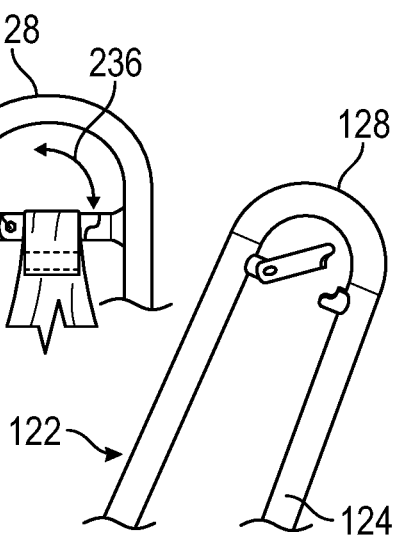

In some embodiments of hammock stands 100, 200, 300 and 400, the distal ends 228 can be formed with a hook or other receiving component to support the hammock 102. In other embodiments, the upright assemblies can have a coupling at the distal ends 228. For exemplary purposes, FIG. 13A is a close up view of the distal end of an embodiment of the upright assembly according to this disclosure, namely the upright assembly 122 of hammock stand 100, although the description following equally applies to the other embodiments of the present invention as well. Referring to FIG. 13A, there is provided a cross bar 230, coupled between legs of the bent portion 124 of the hammock stand 100 near the distal end 128, which can be further provided with a removable carabiner clip 231 to serve as a hanging point for the hammock 102. Thus each upright assembly can have hanging points for the hammock 102. An alternative fastening system is shown in FIG. 13B; there, cross bar 230 is provided with a hook 232, to facilitate securing the hammock 102. A further alternative fastening system is shown in FIG. 13C, which depicts a soft sleeve 233 that snugly fits over distal end 128. A fabric loop 234 can be secured to sleeve 233, and carabiner 231 can be clipped to loop 234 to provide a hanging point for hammock 102. A yet further alternative is shown in FIG. 13D, in which cross bar 230 is pivotally mounted at point 235 to permit it to swing open and closed in direction 236, in a manner substantially the same as the gate portion of a carabiner. The hammock 102 can be directly secured to cross bar 230. Cross bar 230 optionally can be spring-loaded so as to bias it to the closed position.

In some implementations, features of the foregoing embodiments can be mixed and matched as needed to provide easy assembly/folding and sufficient structural support at the joints and to achieve different fold sizes, weight ratings and hanging widths. Accordingly, although upright assemblies 122 are received internally into the hub coupling segments of hubs 114 in FIG. 1, in some embodiments the hub coupling segments of the hubs 114 of the hammock stand 100 can be received internally within the upright assemblies 122, as desired. Likewise, although upright assemblies 222 receive internally the hub coupling segments of hubs 114 in FIG. 2, in some embodiments the upright assemblies 222 are received internally into the hub coupling segments of hubs 114 of the hammock stand 200, as desired.

Other Aspects

The previous description is provided to enable any person skilled in the art to practice the various embodiments described herein. Various modifications to these embodiments will be readily apparent to those skilled in the art, and the generic principles defined herein may be applied to other embodiments.

Thus, the claims are not intended to be limited to the embodiments shown herein, but are to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any embodiment described herein as "exemplary" is not necessarily to be construed as preferred or advantageous over other embodiments. Unless specifically stated otherwise, the term "some" refers to one or more.

Combinations such as "at least one of A, B, or C," "one or more of A, B, or C," "at least one of A, B, and C," "one or more of A, B, and C," and "A, B, C," or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C," or any combination thereof" may be A only, B only, C only, A and B, A and C, B and C, or A and B and C, where any such combinations may contain one or more member or members of A, B, or C.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A collapsible stand for a hammock comprising:
   a support structure having a first hub assembly and a second hub assembly coupled by a pair of cross beams;
   a base portion having four legs removably coupled to, and extended down and away from the support structure, the four legs, the first hub assembly, the second hub assembly, and the pair of cross beams form a frustum of a rectangular pyramid; and
   an upright portion having a first upright assembly and a second upright assembly removably coupled to, and extending up and at angles away from the support structure, the first upright assembly and the second upright assembly each having an attachment point at a distal end opposite the support structure.

2. The collapsible stand of claim 1, wherein the first hub assembly and the second hub assembly each comprise a first hub coupled to a second hub by a support beam, the first hub and the second hub each having couplings operable to receive one leg and a proximal end of the upright assembly.

3. The collapsible stand of claim 1, wherein the support structure is cast as a unitary component.

4. The collapsible stand of claim 2, wherein the first upright assembly and the second upright assembly are coupled to the first hub assembly and the second hub assembly via a press fit.

5. The collapsible stand of claim 2, wherein the first upright assembly and the second upright assembly are coupled to the first hub assembly and the second hub assembly via a spring.

6. The collapsible stand of claim 1, wherein the first leg has a first foot coupled to a first distal end of the first leg opposite the support structure and the second leg has a second foot coupled to a second distal end of the second leg opposite the support structure.

7. The collapsible stand of claim 6, further comprising an elastic coupling cord extending from the first foot, internally through the first leg, a first hub of the first hub assembly, the first upright assembly, a second hub of the first hub assembly, the second leg, and terminating at the second foot.

8. The collapsible stand of claim 1, wherein the first upright assembly and the second upright assembly comprise a rounded-V shape.

9. The collapsible stand of claim 8, wherein the first upright assembly and the second upright assembly each comprises a single tubular member bent into the rounded V-shape.

10. The collapsible stand of claim 8, wherein the first upright assembly and the second upright assembly each comprises two straight portions removably coupled to a bent portion having the rounded V-shape.

11. The collapsible stand of claim 1, wherein the attachment points of each of the first upright assembly and the second upright assembly further comprises a cross bar.

* * * * *